United States Patent
Hasegawa

(10) Patent No.: US 12,023,960 B2
(45) Date of Patent: Jul. 2, 2024

(54) RUBBER COMPOSITION FOR TIRES AND TIRE

(71) Applicant: Toyo Tire Corporation, Itami (JP)

(72) Inventor: Shinya Hasegawa, Itami (JP)

(73) Assignee: Toyo Tire Corporation, Itami (JP)

( * ) Notice: Subject to any disclaimer, the term of this patent is extended or adjusted under 35 U.S.C. 154(b) by 218 days.

(21) Appl. No.: 17/730,290

(22) Filed: Apr. 27, 2022

(65) Prior Publication Data

US 2022/0388338 A1 Dec. 8, 2022

(30) Foreign Application Priority Data

May 26, 2021 (JP) ................................. 2021-088769

(51) Int. Cl.
| | | |
|---|---|---|
| C08K 5/103 | (2006.01) | |
| B60C 1/00 | (2006.01) | |
| C08K 3/04 | (2006.01) | |
| C08L 3/04 | (2006.01) | |
| C08L 7/00 | (2006.01) | |

(52) U.S. Cl.
CPC .............. *B60C 1/0016* (2013.01); *C08K 3/04* (2013.01); *C08K 5/103* (2013.01); *C08L 7/00* (2013.01)

(58) Field of Classification Search
CPC .... B60C 1/00; C08L 7/00; C08K 3/04; C08K 5/103
USPC ......................................................... 523/156
See application file for complete search history.

(56) References Cited

U.S. PATENT DOCUMENTS

2018/0298163 A1   10/2018   Yabe
2019/0233622 A1*   8/2019   Nishikawa .............. C08K 3/36

FOREIGN PATENT DOCUMENTS

| EP | 3390520 A1 * | 10/2018 | ........... B60C 1/0016 |
|---|---|---|---|
| JP | 2016-151018 A | 8/2016 | |
| JP | 2019-131696 A | 8/2019 | |
| WO | 2017/069273 A1 | 4/2017 | |
| WO | WO-2019150875 A1 * | 8/2019 | |

* cited by examiner

*Primary Examiner* — Deve V Hall

(74) *Attorney, Agent, or Firm* — WHDA, LLP

(57) ABSTRACT

A rubber composition for tires according to an embodiment includes a diene rubber, a filler, and a fatty acid ester of a polyoxyalkylene glyceryl ether, and 50 mass % or more of the filler is carbon black. A tire according to an embodiment includes the rubber composition for tires.

8 Claims, No Drawings

RUBBER COMPOSITION FOR TIRES AND TIRE

CROSS-REFERENCE TO RELATED APPLICATIONS

This application is based upon and claims the benefit of priority from the prior Japanese Patent Application No. 2021-088769, filed on May 26, 2021; the entire contents of which are incorporated herein by reference.

BACKGROUND OF THE INVENTION

Field of the Invention

The present invention relates to a rubber composition for tires and also to a tire using the same.

DESCRIPTION OF THE RELATED ART

In a rubber composition for tires, the incorporation of a surfactant has been known. For example, JP-A-2016-151018 discloses that in a silica-containing rubber composition, a novel silane coupling agent is used to improve the fuel efficiency, abrasion resistance, wet performance, and steering stability in a well-balanced manner, and, at the same time, a surfactant such as a polyoxyalkylene derivative is incorporated to promote the dispersion of a filler and prevent discoloration due to deterioration over time.

WO2017/069273 (US-A1-2018/0298163) discloses that in order to obtain excellent destruction resistance, abrasion resistance, and on-ice performance, a surfactant such as a nonionic ester type surfactant is incorporated into a diene rubber component together with staple fibers, and also that as a result of the incorporation of a surfactant, the dispersibility of staple fibers is improved.

JP-A-2019-131696 (US-A1-2019/0233622) discloses that in a silica-containing rubber composition, in order to improve the processability and abrasion resistance, a monoester and/or diester of a polyoxyalkylene glycerin fatty acid ester is incorporated.

SUMMERY OF THE INVENTION

Generally, in a rubber composition, a surfactant is incorporated for the purpose of improving the dispersibility of a highly hydrophilic filler such as silica. It has been unknown that its use in a formulation using a filler composed mainly of carbon black, which has excellent dispersibility, leads to improved performance.

The present inventors have found that in a formulation using a filler composed mainly of carbon black, use of a fatty acid ester of a polyoxyalkylene glyceryl ether, which is a specific surfactant, leads to improvements in tear resistance, abrasion resistance, and bending fatigue resistance. That is, according to an embodiment of the invention, it is desirable to provide a rubber composition for tires, which allows for improvements in tear resistance, abrasion resistance, and bending fatigue resistance in a formulation using a filler composed mainly of carbon black, and also a tire using the same.

A rubber composition for tires according to an embodiment of the invention includes a diene rubber, a filler, and a fatty acid ester of a polyoxyalkylene glyceryl ether, and 50 mass % or more of the filler is carbon black.

A tire according to an embodiment of the invention includes the rubber composition for tires described above.

According to an embodiment of the invention, in a carbon black-containing rubber composition using a filler composed mainly of carbon black, a fatty acid ester of a polyoxyalkylene glyceryl ether is incorporated; as a result, the tear resistance, abrasion resistance, and bending fatigue resistance can be improved.

DESCRIPTION OF THE PREFERRED EMBODIMENTS

A rubber composition for tires according to this embodiment (hereinafter sometimes referred to as "rubber composition") is obtained by incorporating a filler and a fatty acid ester of a polyoxyalkylene glyceryl ether into a diene rubber.

The diene rubber as a rubber component is not particularly limited. For example, various diene rubbers commonly used in rubber compositions, such as natural rubber (NR), synthetic isoprene rubber (IR), butadiene rubber (BR), styrene butadiene rubber (SBR), nitrile rubber (NBR), chloroprene rubber (CR), butyl rubber (IIR), styrene-isoprene copolymer rubber, butadiene-isoprene copolymer rubber, and styrene-isoprene-butadiene copolymer rubber, can be mentioned. These diene rubbers can be used alone, and it is also possible to use a combination of two or more kinds.

A diene rubber according to an preferred embodiment contains at least one member selected from the group consisting of natural rubber, butadiene rubber, and styrene butadiene rubber. The diene rubber more preferably contains at least natural rubber. For example, 100 parts by mass of the diene rubber may include 60 parts by mass or more and 100 parts by mass or less of natural rubber and 0 parts by mass or more and 40 parts by mass or less of butadiene rubber.

In this embodiment, the filler contains carbon black as a main component. That is, the proportion of carbon black in 100 mass % of the filler is 50 mass % or more. When the proportion of carbon black is 50 mass % or more, combined use with the fatty acid ester of a polyoxyalkylene glyceryl ether provides excellent improving effects on tear resistance, abrasion resistance, and bending fatigue resistance. The proportion of carbon black in 100 mass % of the filler is preferably more than 50 mass %, more preferably 60 mass % or more, and still more preferably 70 mass % or more, and may also be 100 mass %.

Carbon black is not particularly limited, and known various species may be used. For example, it is preferable to use carbon black of SAF grade (N100s), ISAF grade (N200s), HAF grade (N300s), or FEF grade (N500s) (all ASTM grades). These grades of carbon black may be used alone, and it is also possible to use a combination of two or more kinds.

The nitrogen adsorption specific surface area ($N_2SA$) (JIS K6217-2) of carbon black is not particularly limited, and may be, for example, 30 to 200 $m^2/g$, 70 to 150 $m^2/g$, or 100 to 130 $m^2/g$.

The amount of filler incorporated is not particularly limited, and may be, per 100 parts by mass of the diene rubber, 20 to 100 parts by mass, 25 to 80 parts by mass, or 30 to 60 parts by mass. The amount of carbon black incorporated is not particularly limited as long as it is 50 mass % or more of the total filler, and may be, for example, per 100 parts by mass of the diene rubber, 15 to 100 parts by mass, 15 to 70 parts by mass, or 20 to 50 parts by mass.

Carbon black may be used alone as a filler, and it is also possible to incorporate silica together with carbon black. The amount of silica incorporated is not particularly limited, and may be, per 100 parts by mass of the diene rubber, 30 parts by mass or less, 25 parts by mass or less, or 5 to 20 parts by mass.

The rubber composition according to this embodiment has incorporated therein a fatty acid ester of a polyoxyalkylene glyceryl ether (hereinafter sometimes referred to as "ether ester"). As a result of incorporating an ether ester into a carbon black formulation, hydrophilic and hydrophobic portions of the ether ester interact with the diene rubber and carbon black, whereby the tear resistance, abrasion resistance, and bending fatigue resistance can be improved.

As the ether ester, one represented by the following general formula (1) is preferably used.

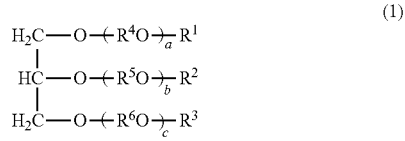

(1)

In formula (1), $R^1$, $R^2$, and $R^3$ each independently represent a hydrogen atom or an aliphatic acyl group having 6 to 30 carbon atoms (i.e., —COR with R being an aliphatic hydrocarbon group), $R^4$, $R^5$, and $R^6$ each independently represent an alkylene group having 2 to 4 carbon atoms, and a, b, and c each independently represent an average addition mole number of alkylene oxides.

With respect to $R^1$, $R_2$, and $R^3$, the aliphatic hydrocarbon group of the aliphatic acyl group may be saturated or unsaturated, and may be linear or branched. Preferably, at least one of $R^1$, $R^2$, and $R^3$ represents an aliphatic acyl group having an unsaturated aliphatic hydrocarbon group, that is, the constituent fatty acids of the ether ester include an unsaturated fatty acid. The content of unsaturated fatty acids in the constituent fatty acids is preferably 50 mol % or more, and more preferably 70 mol % or more. The number of carbon atoms in the aliphatic acyl group is preferably 8 to 25, more preferably 10 to 22, and may also be 12 to 20.

As the ether ester, of polyoxyalkylene glycerin fatty acid esters, a monoester or a diester is preferably used. For example, of ether esters represented by formula (1), a monoester has a main component wherein one of $R^1$, $R^2$, and $R^3$ is an aliphatic acyl group and two are hydrogen atoms, while a diester has a main component wherein two of $R^1$, $R^2$, and $R^3$ are aliphatic acyl groups and one is a hydrogen atom. Here, "main component" refers to a component having the highest molar ratio.

The ether ester may have a distribution in the esterification degree. It can be said that being a fatty acid ester requires that at least one of $R^1$, $R^2$, and $R^3$ is an aliphatic acyl group. However, when there is a distribution in the esterification degree like this, even in the case of a monoester, $R^1$, $R^2$, and $R^3$ may all be hydrogen atoms, and such a mode is also encompassed. The average esterification degree of the ether ester is not particularly limited, and may be, for example, 0.5 to 2.5. Because the ether ester is preferably a monoester or a diester, the average esterification degree is preferably 0.8 to 2.2, more preferably 0.9 to 2.1, and still more preferably 1.0 to 2.0. Here, the average esterification degree is the arithmetic average of the number of aliphatic acyl group substitutions of hydrogen atoms in the three hydroxyl groups of a polyoxyalkylene glyceryl ether (esterification degree). That is, the average esterification degree is the ratio of the moles of esterified fatty acids relative to 1 mole of the polyoxyalkylene glyceryl ether, and is up to 3. Here, the average esterification degree is calculated using $^{13}$C-NMR.

In formula (1), $R^4$, $R^5$, and $R^6$ each independently represent an alkylene group having 2 to 4 carbon atoms, and a, b, and c each independently represent the average addition mole number of alkylene oxides. It is more preferable that $R^4$, $R^5$, and $R^6$ each independently represent a $C_2$ or $C_3$ alkylene group. The alkylene groups of $R^4$, $R^5$, and $R^6$ may be linear or branched. As the oxyalkylene groups represented by $R^4O$, $R^5O$, and $R^6O$, respectively, an oxyethylene group, an oxypropylene group, an oxybutylene group, and the like can be mentioned.

$(R^4O)_a$, $(R^5O)_b$, and $(R^6O)_c$ in formula (1) are each an polyoxyalkylene chain obtained by the addition polymerization of a $C_{2-4}$ alkylene oxide (e.g., ethylene oxide, propylene oxide, butylene oxide, etc.). The polymerization form of the alkylene oxide or the like is not particularly limited, and may be a homopolymer, a random copolymer, or a block copolymer.

It is preferable that $(R^4O)_a$, $(R^5O)_b$, and $(R^6O)_c$ in formula (1) are composed mainly of oxyethylene groups, and it is preferable that oxyethylene groups constitute 60 mass % or more of $(R^4O)_a$, $(R^5O)_b$, and $(R^6O)_c$. That is, the polyoxyalkylene chain represented by $(R^4O)_a$, the polyoxyalkylene chain represented by $(R^5O)_b$, and the polyoxyalkylene chain represented by $(R^6O)_c$ as a whole have an oxyethylene group content of 60 mass % or more, more preferably 80 mass % or more, and particularly preferably 100 mass %. When the oxyethylene group content is 100 mass %, the ether ester is represented by the following general formula (2). As one embodiment, it is preferable that each of $(R^4O)_a$, $(R^5O)_b$, and $(R^6O)_c$ is 60 mass % or more composed of an oxyethylene group.

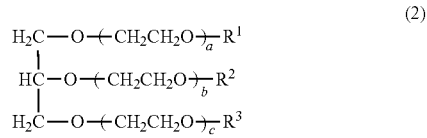

(2)

$R^1$, $R^2$, $R^3$, a, b, and c in formula (2) are the same as $R^1$, $R^2$, $R^3$, a, b, and c in formula (1).

Each of a, b, and c, which represents the average addition mole number of oxyalkylene groups, is preferably 1 or more. The sum of a, b, and c, that is, a+b+c, is preferably 3 to 60, more preferably 3 to 50, and may also be 3 to 30, or 4 to 20.

The ether ester preferably has a hydrophilic lipophilic balance (HLB) of 13 or less. When the HLB is 13 or less, the interaction between the hydrophobic portion of such a compound with the diene rubber and carbon black is better balanced. Accordingly, the improving effects on tear resistance, abrasion resistance, and bending fatigue resistance in a carbon black formulation can be enhanced. The HLB of the ether ester is preferably 3 to 13, more preferably 5 to 12, and still more preferably 7 to 10.

Here, HLB is a value calculated by the following Griffin's formula. When the value is larger, the proportion of the hydrophilic portion in the entire molecule is higher, indicating higher hydrophilicity.

HLB=20×(molecular weight of the hydrophilic portion)/(entire molecular weight)

The molecular weight of the hydrophilic portion in the formula is the molecular weight of the polyoxyalkylene chains represented by $(R^4O)_a$, $(R^5O)_b$, and $(R^6O)_c$.

The amount of ether ester incorporated is not particularly limited, but is, per 100 parts by mass of the diene rubber, preferably 0.5 to 10 parts by mass, and more preferably 1 to 8 parts by mass.

In addition to the above components, the rubber composition according to this embodiment may have incorporated therein various additives generally used in rubber compositions, such as zinc oxide, stearic acid, antioxidants, oils, waxes, vulcanizing agents, and vulcanization accelerators. When silica is used together with carbon black as a filler, a silane coupling agent may be incorporated. The amount of silane coupling agent incorporated is preferably 2 to 20 mass % relative to the amount of silica incorporated.

Sulfur is preferably used as a vulcanizing agent. The amount of vulcanizing agent incorporated is not particularly limited, but is, per 100 parts by mass of the diene rubber, preferably 0.1 to 10 parts by mass, and more preferably 0.5 to 5 parts by mass. In addition, as vulcanization accelerators, for example, sulfenamide-based, thiuram-based, thiazole-based, guanidine-based, and like various vulcanization accelerators can be mentioned. They may be used alone, and it is also possible to use a combination of two or more kinds. The amount of vulcanization accelerator incorporated is not particularly limited, but is, per 100 parts by mass of the diene rubber, preferably 0.1 to 7 parts by mass, and more preferably 0.5 to 5 parts by mass.

The rubber composition according to this embodiment can be made by kneading in the usual manner using a commonly used mixer, such as a Banbury mixer, a kneader, or a roll. That is, for example, in the first mixing stage (nonproductive mixing step), a filler, an ether ester, and also additives other than a vulcanizing agent and a vulcanization accelerator are added to a diene rubber and mixed. Next, in the final mixing stage (productive mixing step), a vulcanizing agent and a vulcanization accelerator are added to the obtained mixture and mixed, whereby an unvulcanized rubber composition can be prepared.

The rubber composition according to this embodiment can be used as a rubber composition for tires. As tires, pneumatic tires of various sizes for various applications, including passenger car tires, heavy-load tires for trucks and buses, and the like, can be mentioned. A tire according to an embodiment is provided with a rubber part made of the above rubber composition. As application sites in a tire, for example, a tread rubber, a sidewall rubber, and the like can be mentioned, and application to a tread rubber is preferable.

The tread rubber of a pneumatic tire may have a structure composed of two layers of a cap rubber and a base rubber, or may have a single-layer structure having a cap rubber and a base rubber integrated. In the case of a single-layer structure, the above rubber composition may be used to form the tread rubber. In the case of a two-layer structure, the above rubber composition may be used to form a cap rubber, or the above rubber composition may be used to form a base rubber.

The method for producing a pneumatic tire is not particularly limited. For example, the above rubber composition is formed into a predetermined shape by extrusion in the usual manner, and then combined with other members, thereby making an unvulcanized tire (green tire). For example, the above rubber composition is used to make a tread rubber, and then combined with other tire members, thereby making an unvulcanized tire. Subsequently, vulcanization molding is performed at 140 to 180° C., for example, whereby a pneumatic tire can be produced.

Incidentally, with respect to the various numerical ranges for the amounts of incorporation, the number of carbon atoms, the average esterification degree, the average addition mole number, HLB, and the like described above, the upper limit and lower limit of each range can be arbitrarily combined, and all such combinations are incorporated herein as preferred numerical ranges.

EXAMPLES

Examples will be shown hereinafter, but the invention is not limited to these examples.

Measurement Method for Average Esterification Degree $^{13}$C-NMR was used to calculate the average esterification degree. The measurement conditions were as follows: observation nucleus: $^{13}$C, observation frequency: 100.648 MHz, pulse width: 90° C., solvent: CDCl$_3$, concentration: 5 mass %. As the calculation method, the following formula was used.

Average esterification degree=(peak area of ester carbon appearing near 173.8 ppm)/(peak area of the following carbon (I) appearing near 78.3 ppm)

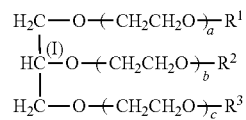

Examples 1 to 6, Comparative Example 1

Using a Banbury mixer, a rubber composition was prepared according to the formulation (part by mass) shown below in Table 1. Specifically, first, in the first mixing stage, agents to be incorporated excluding sulfur and a vulcanization accelerator were added to a rubber component and kneaded (discharge temperature=160° C.). Next, in the final mixing stage, sulfur and a vulcanization accelerator were added to the obtained kneaded product and kneaded (discharge temperature: 90° C.), thereby preparing an unvulcanized rubber composition. "CB Proportion" in Table 1 is the proportion of carbon black (mass %) in the filler. The details of the components in Table 1 are as follows.

Natural rubber: RSS #3
Carbon black: "SEAST 6" (N$_2$SA=119 m$^2$/g) manufactured by Tokai Carbon Co., Ltd.
Silica: "Ultrasil VN3" manufactured by EVONIK
Silane coupling agent: "Si69" manufactured by EVONIK
Zinc oxide: "Zinc Oxide, Type 2" manufactured by Mitsui Mining & Smelting Co., Ltd.
Stearic acid: "Beads Stearic Acid" manufactured by NOF Corporation
Antioxidant: "Nocrac 6C" manufactured by Ouchi Shinko Chemical Industrial Co., Ltd.
Vulcanization accelerator: "Sanceler NS-G" manufactured by Sanshin Chemical Industry Co., Ltd.
Sulfur: "Powder Sulfur" manufactured by Tsurumi Chemical Industry Co., Ltd.
Ether ester A: Fatty acid ester (monoester) of polyoxyethylene glyceryl ether represented by formula (2).

a+b+c=5, aliphatic acyl group: —COC$_{17}$H$_{33}$, average esterification degree=1.1, HLB=8. The ether ester A was synthesized in accordance with the method described in US-A1-2019/0233622, paragraph [0043]. The entire contents of US-A1-2019/0233622 are incorporated herein by reference.

Ether ester B: Fatty acid ester (monoester) of polyoxyethylene glyceryl ether represented by formula (2). +b+c=11.8, aliphatic acyl group: —COC$_{17}$H$_{33}$, average esterification degree=1.2, HLB=13. The ether ester B was synthesized in accordance with the method described in US-A1-2019/0233622, paragraph [0045].

Ether ester C: Fatty acid ester (diester) of polyoxyethylene glyceryl ether represented by formula (2). a+b+c=6, aliphatic acyl group: —COC$_{17}$H$_{33}$, average esterification degree=2.1, HLB=6. The ether ester C was synthesized in accordance with the method described in US-A1-2019/0233622, paragraph [0049].

The tear resistance, abrasion resistance, and bending fatigue resistance of each obtained rubber composition were evaluated using a test piece having a predetermined shape prepared by vulcanization at 160° C. for 30 minutes. The evaluation methods are as follows.

Tear resistance: Tear strength was measured in accordance with JIS K6252 (crescent type test piece), and expressed as an index taking the value of Comparative Example 1 as 100. The larger the value, the higher the tear strength.

Abrasion resistance: Abrasion loss was measured in accordance with JIS K6264 using a Lambourn abrasion tester manufactured by Iwamoto Seisakusho Co., Ltd., with a slip ratio of 30%, under a load of 40 N, and at a sand fall rate of 20 g/min. The reciprocal of the measurement was expressed as an index taking the value of Comparative Example 1 as 100. The larger the value, the better the abrasion resistance.

Bending fatigue resistance: The time until 10-mm cracking in the test piece was measured in accordance with JIS K6260, and expressed as an index taking the value of Comparative Example 1 as 100. The larger the value, the better the bending fatigue resistance.

The results are as shown in Table 1. In Examples 1 to 6 where an ether ester A, B, or C was incorporated in a formulation using a filler composed mainly of carbon black, the tear resistance, abrasion resistance, and bending fatigue resistance improved over Comparative Example 1 where no ether ester was incorporated.

Example 11 and Comparative Example 11

A rubber composition was prepared according to the formulation (part by mass) shown below in Table 2 in otherwise the same manner as in Example 1, and the tear resistance, abrasion resistance, and bending fatigue resistance were evaluated. BR in Table 2 is polybutadiene rubber ("BR150L" manufactured by Ube Industries, Ltd.). Other components are the same as in Table 1. In the evaluation of each of tear resistance, abrasion resistance, and bending fatigue resistance, the value was expressed as an index taking the value of, instead of Comparative Example 1, Comparative Example 11 as 100.

TABLE 2

|  | Comparative Example 11 | Example 11 |
|---|---|---|
| Formulation (part by mass) | | |
| Natural Rubber | 80 | 80 |
| BR | 20 | 20 |
| Carbon Black | 40 | 40 |
| Zinc Oxide | 3 | 3 |
| Stearic Acid | 2 | 2 |
| Antioxidant | 2 | 2 |
| Ether Ester A | — | 1 |
| Vulcanization Accelerator | 1.4 | 1.4 |
| Sulfur | 1.6 | 1.6 |
| CB Proportion | 100 | 100 |
| Evaluation | | |
| Tear Resistance | 100 | 125 |
| Abrasion Resistance | 100 | 110 |
| Bending Fatigue Resistance | 100 | 145 |

The results are as shown in Table 2. Even in the case where the filler was carbon black alone (CB proportion=100 mass %), in Example 11 where an ether ester was incorpo-

TABLE 1

|  | Comparative Example 1 | Example 1 | Example 2 | Example 3 | Example 4 | Example 5 | Example 6 |
|---|---|---|---|---|---|---|---|
| Formulation (part by mass) | | | | | | | |
| Natural Rubber | 100 | 100 | 100 | 100 | 100 | 100 | 100 |
| Carbon Black | 25 | 25 | 25 | 25 | 25 | 25 | 25 |
| Silica | 10 | 10 | 10 | 10 | 10 | 10 | 10 |
| Silane Coupling Agent | 1 | 1 | 1 | 1 | 1 | 1 | 1 |
| Zinc Oxide | 3 | 3 | 3 | 3 | 3 | 3 | 3 |
| Stearic Acid | 2 | 2 | 2 | 2 | 2 | 2 | 2 |
| Antioxidant | 2 | 2 | 2 | 2 | 2 | 2 | 2 |
| Ether Ester A | — | 0.5 | 1 | 5 | 10 | — | — |
| Ether Ester B | — | — | — | — | — | 1 | — |
| Ether Ester C | — | — | — | — | — | — | 1 |
| Vulcanization Accelerator | 1.4 | 1.4 | 1.4 | 1.4 | 1.4 | 1.4 | 1.4 |
| Sulfur | 1.6 | 1.6 | 1.6 | 1.6 | 1.6 | 1.6 | 1.6 |
| CB Proportion | 71.4 | 71.4 | 71.4 | 71.4 | 71.4 | 71.4 | 71.4 |
| Evaluation | | | | | | | |
| Tear Resistance | 100 | 115 | 125 | 135 | 145 | 123 | 128 |
| Abrasion Resistance | 100 | 110 | 110 | 120 | 130 | 109 | 111 |
| Bending Fatigue Resistance | 100 | 115 | 135 | 142 | 151 | 133 | 137 | rated, the tear resistance, abrasion resistance, and bending fatigue resistance improved over Comparative Example 11 without such incorporation.

Example 21 and Comparative Example 21

A rubber composition was prepared according to the formulation (part by mass) shown below in Table 3 in otherwise the same manner as in Example 1, and the tear resistance, abrasion resistance, and bending fatigue resistance were evaluated. The components in Table 3 are the same as in Table 1 and Table 2. In the evaluation of each of tear resistance, abrasion resistance, and bending fatigue resistance, the value was expressed as an index taking the value of, instead of Comparative Example 1, Comparative Example 21 as 100.

TABLE 3

|  | Comparative Example 21 | Example 21 |
| --- | --- | --- |
| Formulation (part by mass) | | |
| Natural Rubber | 80 | 80 |
| BR | 20 | 20 |
| Carbon Black | 22 | 22 |
| Silica | 20 | 20 |
| Silane Coupling Agent | 2 | 2 |
| Zinc Oxide | 3 | 3 |
| Stearic Acid | 2 | 2 |
| Antioxidant | 2 | 2 |
| Ether Ester A | — | 1 |
| Vulcanization Accelerator | 1.4 | 1.4 |
| Sulfur | 1.6 | 1.6 |
| CB Proportion | 52.4 | 52.4 |
| Evaluation | | |
| Tear Resistance | 100 | 130 |
| Abrasion Resistance | 100 | 115 |
| Bending Fatigue Resistance | 100 | 141 |

The results are as shown in Table 3. Even in the case where the amount of silica in a filler was increased while using carbon black as a main component (CB proportion=52.4 mass %), in Example 21 where an ether ester was incorporated, the tear resistance, abrasion resistance, and bending fatigue resistance improved over Comparative Example 21 without such incorporation.

As above, use of a fatty acid ester of a polyoxyalkylene glyceryl ether not in a formulation using a filler composed mainly of silica but in a formulation using a filler composed mainly of carbon black provided unexpected effects, that is, improvements in tear resistance, abrasion resistance, and bending fatigue resistance.

Some embodiments of the invention have been described above. These embodiments are presented as examples and not intended to limit the scope of the invention. These embodiments can be implemented in other various modes, and, without departing from the gist of the invention, various omissions, substitutions, and changes can be made thereto. These embodiments, as well as omissions, substitutions, and changes thereto, etc., fall within the scope and gist of the invention, and also fall within the scope of the claimed invention and its equivalents.

What is claimed is:

1. A rubber composition for tires, comprising:
   a diene rubber;
   a filler; and
   a fatty acid ester of a polyoxyalkylene glyceryl ether,
   50 mass % or more of the filler being carbon black,
   wherein the fatty acid ester of a polyoxyalkylene glyceryl ether has an HLB of 13 or less.

2. The rubber composition for tires according to claim 1, wherein the fatty acid ester of a polyoxyalkylene glyceryl ether is present in an amount of 0.5 to 10 parts by mass per 100 parts by mass of the diene rubber.

3. The rubber composition for tires according to claim 1, wherein in 100 parts by mass of the diene rubber, 60 parts by mass or more and 100 parts by mass or less of natural rubber and 0 parts by mass or more and 40 parts by mass or less of butadiene rubber are included.

4. The rubber composition for tires according to claim 1, wherein the fatty acid ester of a polyoxyalkylene glyceryl ether is represented by the following general formula (1):

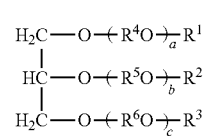

wherein $R^1$, $R^2$, and $R^3$ each independently represent a hydrogen atom or an aliphatic acyl group having 6 to 30 carbon atoms, $R^4$, $R^5$, and $R^6$ each independently represent an alkylene group having 2 to 4 carbon atoms, and a, b, and c each independently represent an average addition mole number of alkylene oxides.

5. The rubber composition for tires according to claim 4, wherein at least one of $R^1$, $R^2$, and $R^3$ in the formula (1) represents an aliphatic acyl group having an unsaturated aliphatic hydrocarbon group.

6. The rubber composition for tires according to claim 4, wherein the sum of a, b, and c in the formula (1) is 3 to 60.

7. The rubber composition for tires according to claim 1, wherein the fatty acid ester of a polyoxyalkylene glyceryl ether has an average esterification degree of 0.5 to 2.5.

8. A tire comprising the rubber composition for tires according to claim 1.

* * * * *